United States Patent [19]

Friis

[11] 3,858,774
[45] Jan. 7, 1975

[54] VEHICLE ROOF CARRIER
[75] Inventor: Odd Friis, Newport Beach, Calif.
[73] Assignee: International Telephone and Telegraph Corporation, New York, N.Y.
[22] Filed: Mar. 30, 1973
[21] Appl. No.: 346,290

[52] U.S. Cl............................................ 224/42.1 F
[51] Int. Cl............................................ B60n 11/00
[58] Field of Search...... 224/42.1 F, 42.1 E, 42.1 R, 224/42.1 G, 42.1 H, 29 R

[56] References Cited
UNITED STATES PATENTS
| | | | |
|---|---|---|---|
| 2,596,860 | 5/1952 | McCrory et al. | 224/42.1 E |
| 2,983,414 | 5/1961 | Fehr | 224/42.1 F |
| 3,109,569 | 11/1963 | Hare | 224/42.1 F |
| 3,281,030 | 10/1966 | Gosswiller | 224/42.1 F |
| 3,677,451 | 7/1972 | Burland | 224/42.1 F |

FOREIGN PATENTS OR APPLICATIONS
73,853  10/1944  Czechoslovakia.............. 224/42.1 F Primary Examiner—Robert J. Spar
Assistant Examiner—Jerold M. Forsberg
Attorney, Agent, or Firm—Thomas L. Peterson

[57] ABSTRACT

A carrier for signal lights and sirens adapted to be secured to the roof of a vehicle. The carrier includes a pair of mounting bars which extend transversely of the roof. Clamps at the ends of the bars are rotatably connected to tubular legs. The ends of the legs are rotatably mounted to support members having rubber bases which engage the vehicle roof. A tie-down clamp is rotatably connected at one end to each of the legs and is connected at its other end to the vehicle drain gutter. This arrangement provides positive, universal mounting of the carrier to a wide variety of vehicles.

10 Claims, 5 Drawing Figures

PATENTED JAN 7 1975

3,858,774

3,858,774

VEHICLE ROOF CARRIER

BACKGROUND OF THE INVENTION

The present invention relates to an improved carrier for vehicle roofs and, more particularly, to such a carrier for mounting signal lights and sirens of the type used on police, fire, and emergency vehicles.

It is desirable that carriers of the type to which the present invention relates be universally adjustable so that they may be easily and detachably secured to vehicle roofs of a wide variety of configurations. One such carrier is disclosed in U.S. Pat. No. 3,281,030 to Gosswiller. This patent discloses a vehicle roof carrier comprising a mounting bar which extends transversely of the vehicle roof. The bar is connected at its opposite ends to curved brackets by means of suitable clamps in which the brackets are rotatably mounted. The ends of the brackets carry hooks which engage the drain gutters of the vehicle. While this structure provides universal clamping to wide variety of vehicle roofs, it embodies only a signal mounting bar and, therefore, does not afford as heavy a supporting structure for sirens and lights as may be desired for some applications. In addition, since the mounting bar is connected to the curved drain gutter of the vehicle roof, the carrier cannot be clamped to the roof in as steady and positive a manner as is often required. The purpose of the present invention is to overcome the foregoing disadvantages of the prior art vehicle roof carrier yet retain the advantages thereof of universal mounting to a wide variety of roof configurations.

SUMMARY OF THE INVENTION

According to the principal aspect of the present invention, there is provided a carrier for sirens and signal lights or the like, which is adapted to be secured to the roof of a vehicle. The carrier includes at least one mounting bar which extends transversely of the vehicle roof. Clamps at the ends of the bar are rotatably connected to tubular legs which have end portions that extend to opposite sides of and below the bar. Such end portions are rotatably mounted to leg supports which engage the vehicle roof at positions spaced from the drain gutter of the roof. A tie-down clamp is rotatably connected at one end to each of the tubular legs and at its other end to the vehicle drain gutter to securely clamp the carrier onto the roof. Preferably, the leg supports embody rubber bases which directly engage the roof of the vehicle and absorb vibrations from the roof. Because the tubular legs are rotatably mounted at their ends to leg supports on the roof, the intermediate sections of the legs may be straight and thus permit a plurality of mounting bars to be attached thereto in planar relationship. Because more than one mounting bar may be embodied in the carrier of the present invention, relatively large or intricate lights and sirens may be firmly mounted to the bars and adequately supported thereby. Other aspects and advantages of the present invention will become more apparent from the following description taken in connection with the accompanying drawing.

DESCRIPTION OF THE PREFERRED EMBODIMENT

Figure 1:
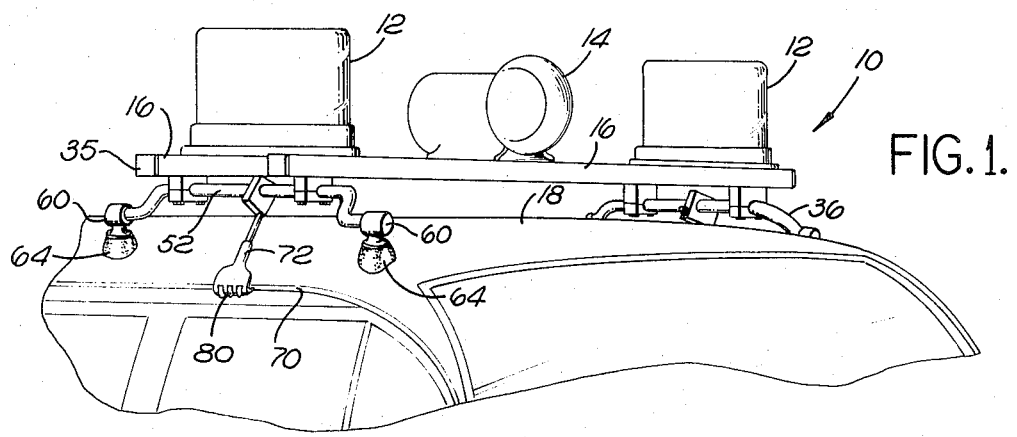
FIG. 1 is a perspective view illustrating the carrier of the present invention mounted on a vehicle roof.

Referring now to the drawing in detail, the carrier of the present invention, generally designated 10, is shown in FIG. 1 as supporting a pair of spaced rotating signal lights 12 and a siren 14.

The carrier 10 includes a pair of parallel mounting bars 16 which extend transversely of the roof 18 of the vehicle upon which the carrier is positioned. However, only a single mounting bar could be employed, if desired, or greater than two bars could be used. The mounting bars are identical. Each bar 16 is preferably an extruded aluminum channel having an upper wall 20, lower wall 22, and side walls 24. Flanges 26 on the side walls 24 extend into the interior of the hollow bar between the upper and lower walls 20 and 22 thereof. A longitudinally extending slot 28 extends the entire length of the lower wall 22 of the bar. An elongated metal strip 30 positioned on top of the flanges 26 separates the hollow channel into upper and lower chambers 32 and 34. The upper chamber 32 is adapted to carry the wires, not shown, which extend from the interior of the vehicle to the lights 12 and siren 14. Caps 35 close the respective ends of the hollow bars 16.

Figure 4:
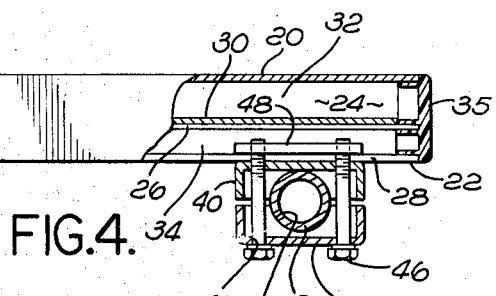
FIG. 4 is a partial vertical sectional view taken along line 4—4 of FIG. 2.

A tubular leg 36 is mounted at each end of the bars 16 by means of clamps 38. As best seen in FIG. 4, each clamp includes an upper jaw 40 and lower jaw 42 which are cut out at their adjacent walls to define a cylindrical opening 44 that extends transversely of the bars 16 and rotatably receives the tubular leg 36 therein. The jaws 40 and 42 are secured to the tubular leg 36 and to the mounting bar 16 by means of screws 46 which extend vertically upwardly through the jaws into the slot 28 in the bar 16. The screws are threadably engaged at their upper ends into a plate 48. This plate is supported by the lower wall 22 of the mounting bar 16 and is adapted to slide longitudinally within the lower chamber 34 of the bar. It will be appreciated that by loosening the screws 46, the clamp 38 may be adjusted longitudinally of the bar 16, and the tubular leg 36 may be rotated relative to the clamp.

Figure 2:
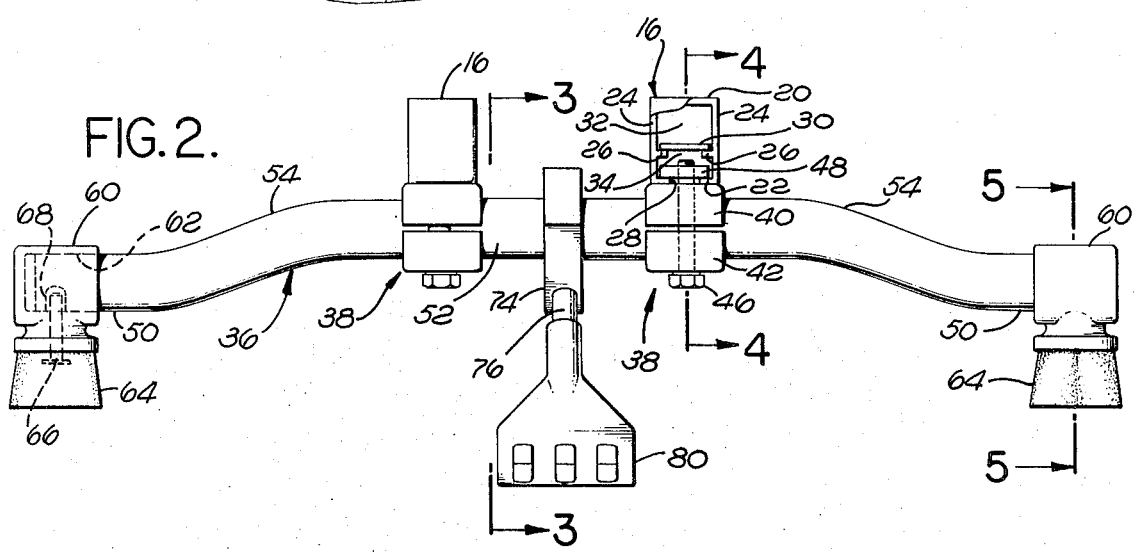
FIG. 2 is an end elevation of the carrier.
Figure 3:
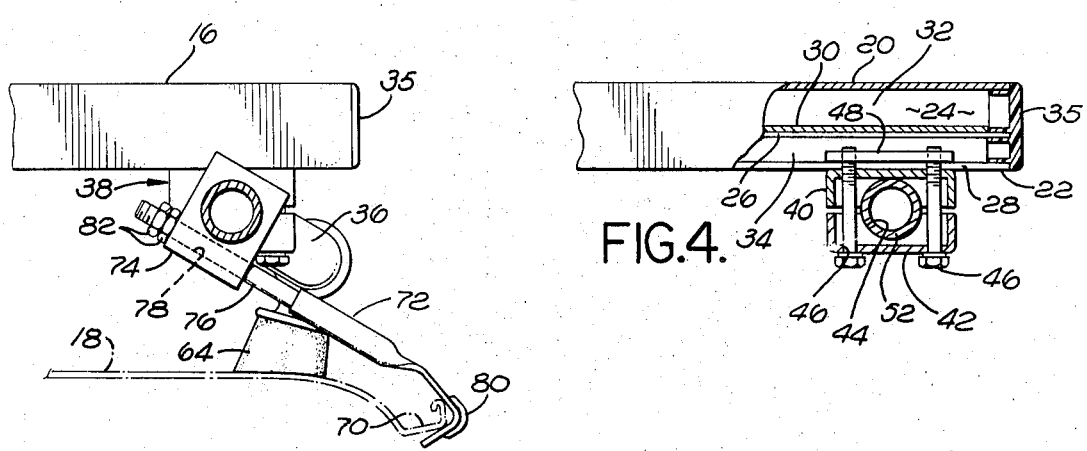
FIG. 3 is a vertical sectional view taken along line 3—3 of FIG. 2.

Each tubular leg 36 extends to opposite sides of and below the mounting bars 16 and terminate in tubular end portions 50. The end portions 50 are coaxial with one another so as to be rotatable about a common axis which extends transversely of the mounting bars 16. The intermediate section 52 of each leg 36 is generally straight and is joined to the end portions 50 by transitional curved portions 54. The intermediate section 52 lies parallel to the axis of rotation of the end portions 50. As best seen in FIG. 2, the clamps 38 on the ends of the mounting bars 16 are engaged with the intermediate straight sections of the legs 36. Thus, the mounting bars 16 will lie in a horizontal plane, which is parallel to the plane of the intermediate straight sections of the legs 36, when the legs are horizontally positioned on the vehicle roof 18. With the legs and bars so positioned on the vehicle roof, the lights and siren carried thereby will be disposed in the appropriate upright position.

Figure 5:
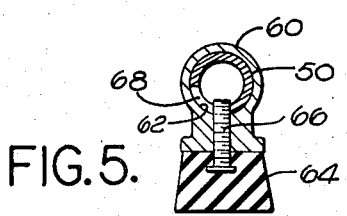
FIG. 5 is a vertical sectional view taken along line 5—5 of FIG. 2.

The tubular end portions 50 of the legs 36 are rotatably mounted relative to the vehicle roof by means of leg supports 60. Each leg support is formed with a cylindrical cavity 62 which receives an end portion 50 of the leg. Each leg support includes a rubber base or bumper 64 which frictionally engages the surface of the roof 18 of the vehicle. A screw 66 molded into the base 64 extends vertically upwardly into an arcuate slot 68 in the end portion 50 of the leg 36, as best seen in FIG. 5, which permits the leg to be rotated relative to the support about 90°. It will be appreciated that due to the offset configuration of the legs 36, when the legs are rotated in the supports 60 while the clamps 38 are relatively loose, the height of the mounting bars 16 may be raised or lowered as desired to adjust to the crown or height of the roof 18. Also, because the clamps 38 are slidably adjustable on the mounting bars 16, the carrier may be adjusted to accommodate for different widths of vehicle roofs.

The legs 36 on the opposite ends of the mounting bars 16 are fixed to the drain gutters 70 at opposite sides of the roof 18 by means of clamps 72. Each clamp includes an anchor block 74 which is rotatably mounted on the intermediate straight section 52 of each leg 36. A rod 76 extends through a passage 78 in the block 74 and terminates in its lower end in a hook 80 which engages the drain gutter. The opposite end of the rod 76 is threaded to receive a pair of nuts 82 which may be tightened to firmly secure the carrier to the roof. It will be appreciated that the supports 60 provide the major support for the carrier 10 on the roof of the vehicle. Since these elements have rubber bases which engage the roof, the major portion of the vibrations of the roof will be absorbed by the rubber bases, thereby minimizing vibrations at the mounting bars 16. Also, because of the particular construction of the present invention permitting the use of a plurality of mounting bars 16, and the six-point attachment of the carrier 10 to the vehicle roof by means of the four bumpers 64 and two tie-down clamps 72, the carrier will have substantial strength and may be positively mounted on the vehicle roof in a scratch-free manner. Preferably, the rotating lights 12 and siren 14 are mounted on support plates, not shown, which will be rigidly attached at their opposite ends to the mounting bars 16, thus providing strong support for these elements and allowing relatively large lights and sirens to be firmly mounted on the vehicle roof. The lights and sirens are, or course, simply representative of a wide variety of uses to which the carrier structure of the present invention may be put, it being appreciated that the carrier can mount other devices if desired.

What is claimed is:

1. A carrier for a vehicle roof having drain gutters along the sides thereof comprising:

at least one mounting bar adapted to extend transversely of said vehicle roof, clamping means mounted on opposite ends of said bar, said clamping means being slidably adjustable longitudinally of said bar;

each said clamping means forming an opening extending transversely of said bar;

a tubular leg having a generally straight central portion and axially offset, coaxial end portions;

said tubular leg rotatably mounted about the longitudinal axis of its central portion in said opening of each said clamping means, said tubular end portions extending to opposite sides of said clamping means below said bar, said tubular end portions being spaced from said clamping means;

a separate leg support at each end of said legs adapted to engage said vehicle roof at positions spaced from said drain gutters and to support the tubular leg, said leg supports for each leg having cylindrical bearing surfaces coaxial with respect to each other defining an axis of rotation and perpendicularly extending portions for engaging the vehicle roof, said tubular end portions of each said leg being mounted on said bearing surfaces of its corresponding leg supports for rotation about said axis; and second clamping means on each said tubular leg between said end portions thereof for connecting said leg to a drain gutter.

2. A carrier as set forth in claim 1 wherein:
   each said second clamping means includes an element rotatably mounted on its respective tubular leg and hook means engagable with a drain gutter.

3. A carrier as set forth in claim 1 wherein:
   a pair of said mounting bars are provided extending parallel to each other in a common plane and transversely of said vehicle roof, each said mounting bar having one of said clamping means mounted on the ends thereof, said legs being mounted in the said openings in said clamping means.

4. A carrier as set forth in claim 1 wherein:
   said second clamping means on each said tubular leg is mounted between said bars.

5. A carrier as set forth in claim 1 wherein:
   each said leg is formed with a generally straight intermediate section located between and offset from said end portions, said intermediate section being parallel to said axis of rotation and being sufficiently long to mount thereon two of said clamping means.

6. A carrier as set forth in claim 5 wherein:
   a pair of said mounting bars are provided extending parallel to each other in a common plane and transversely of said vehicle roof, each said mounting bar having one of said clamping means mounted on the ends thereof, said intermediate sections of said legs being mounted in the said openings in said clamping means; and
   second clamping means are positioned on each said tubular leg intermediate section between said bars for connecting said leg to a drain gutter.

7. A carrier for a vehicle roof comprising:
   at least one mounting bar adapted to extend transversely of said vehicle roof;
   clamping means mounted on opposite ends of said bar, each said clamping means forming an opening extending transversely of said bar;
   a tubular leg having a generally straight central portion and axially offset, coaxial end portions, each said central portion being parallel to its respective axis of rotation;
   said tubular leg rotatably mounted about the longitudinal axis of its central portion in said opening of each of said clamping means, said cylindrical end portions extending to opposite sides of and below said bar; and
   a separate leg support at each end of said legs adapted to frictionally engage said vehicle roof and to support the tubular leg, said leg supports for each said leg having cylindrical bearing surfaces coaxial with respect to each other defining an axis of rotation and perpendicularly extending portions for engaging the vehicle roof, said end portions of each said leg being mounted on said bearing surfaces of its corresponding leg support for rotation about said axis.

8. A carrier as set forth in claim 7 wherein:
each said leg support has an elastomeric base directly engaging said roof.

9. A carrier as set forth in claim 8 including:
second rotatable clamping means on said central portion of each said tubular leg for connecting said leg to a drain gutter.

10. A carrier as set forth in claim 7 wherein:
a pair of said mounting bars are provided extending parallel to each other in a common plane, said plane lying parallel to the plane in which said central portion lie; and said clamping means engaging said central portions of said legs.

* * * * *